(12) United States Patent
Kim et al.

(10) Patent No.: US 12,361,665 B2
(45) Date of Patent: Jul. 15, 2025

(54) MULTI-BAND IMAGE GENERATION SYSTEM AND METHOD USING DEEP-LEARNING NETWORK

(71) Applicant: Korea Aerospace Research Institute, Daejeon (KR)

(72) Inventors: Shinwook Kim, Daejeon (KR); Haeng-Pal Heo, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 429 days.

(21) Appl. No.: 17/968,945

(22) Filed: Oct. 19, 2022

(65) Prior Publication Data

US 2023/0126153 A1 Apr. 27, 2023

(30) Foreign Application Priority Data

Oct. 27, 2021 (KR) .................. 10-2021-0144405

(51) Int. Cl.
*G06V 10/143* (2022.01)
*G06T 5/50* (2006.01)
*G06V 10/82* (2022.01)
*G06V 20/13* (2022.01)

(52) U.S. Cl.
CPC .............. *G06V 10/143* (2022.01); *G06T 5/50* (2013.01); *G06V 10/82* (2022.01); *G06T 2207/10032* (2013.01); *G06V 20/13* (2022.01)

(58) Field of Classification Search
CPC ...... G06V 10/143; G06V 10/82; G06V 20/13; G06T 5/50; G06T 2207/10032
See application file for complete search history.

(56) References Cited

FOREIGN PATENT DOCUMENTS

| KR | 102160682 B1 | 9/2020 |
| KR | 102170260 B1 | 10/2020 |
| KR | 102285530 B1 | 8/2021 |

OTHER PUBLICATIONS

Azarang et al, "Deep Learning-Based Detail Map Estimation for MultiSpectral Image Fusion in Remote Sensing" (published at https://arxiv.org/abs/2102.03830, Feb. 2021).*
Notice of Allowance issued in corresponding Korean Patent Appl. No. 10-2021-0144405 dated Jul. 2, 2023.
Soomin Seo et al., "UPSNet: Unsupervised Pan-Sharpening Network with Registration Learning between Panchromatic and Multi-Spectral Images", 10.1109/ACCESS.2020.3035802, IEEE Access.

* cited by examiner

Primary Examiner — Casey L Kretzer
(74) Attorney, Agent, or Firm — Blank Rome LLP (57) ABSTRACT

The present invention relates to a multi-band image generation system and method using a deep-learning network, and to a technology of generating a multi-band image based on an image of a panchromatic band by analyzing a nonlinear relationship between the panchromatic band and each multi-band using a deep-learning network.

8 Claims, 3 Drawing Sheets

MULTI-BAND IMAGE GENERATION SYSTEM AND METHOD USING DEEP-LEARNING NETWORK

CROSS-REFERENCE TO RELATED APPLICATIONS

This application claims priority under 35 U.S.C. § 119 to Korean Patent Application No. 10-2021-0144405, filed on Oct. 27, 2021, in the Korean Intellectual Property Office, the disclosure of which is incorporated herein by reference in its entirety.

TECHNICAL FIELD

The following disclosure relates to a multi-band image generation system and method using a deep-learning network, and more particularly, to a multi-band image generation system and method using a deep-learning network capable of flexibly coping with a failure of an image sensor of a specific band among multi-band image sensors mounted on a satellite fails or noise of a specific band generated in image data by fusing images with the deep-learning network.

BACKGROUND

Since a high-resolution electro-optical satellite image may regularly provide image information of a wide area, satellite images have been widely used in various industries and environmental fields. In particular, the fields that most require high-resolution electro-optical satellite images are military and security fields, and the importance of the high-resolution electro-optical satellite image is being highlighted.

In order to satisfy the purpose of application in these various fields, an electro-optical camera mounted on a satellite is generally equipped with a multi-band image sensor.

Figure 1:
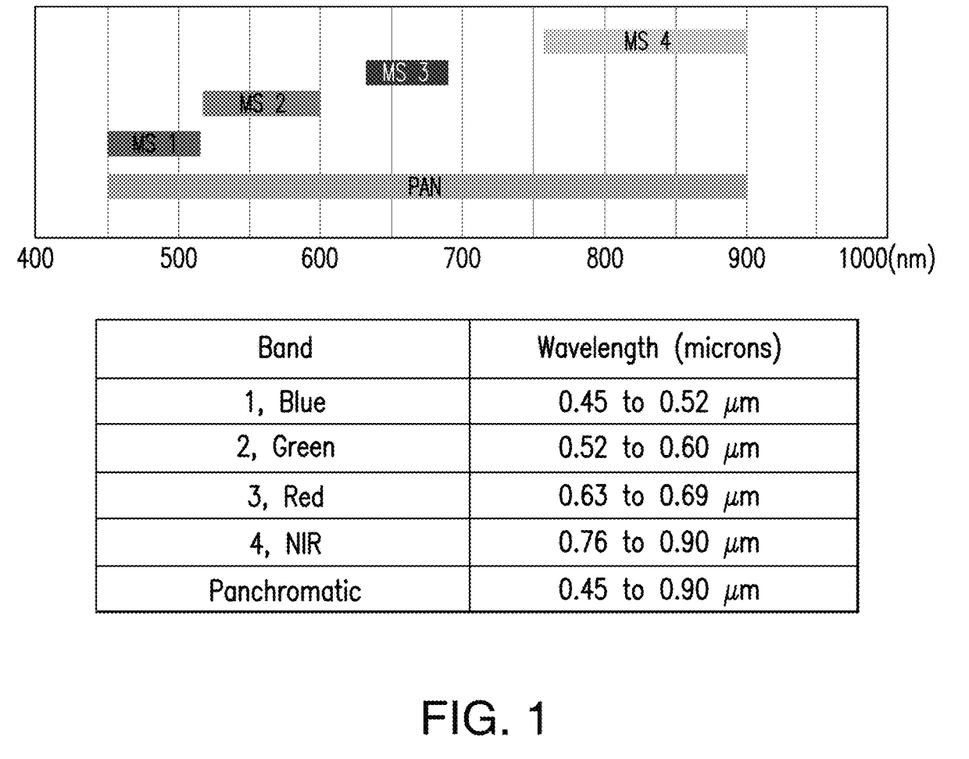
FIG. 1 is an exemplary diagram illustrating a multi-band spectral range and a wavelength band obtainable from multi-band image sensors mounted on a multi-purpose satellite.

As illustrated in FIG. 1, Korea Multi-Purpose Satellite-3 (KOMPSAT-3) includes image sensors in red, green, and blue wavelength bands for capturing visible light as well as image sensors for image acquisition in a mid-wavelength infrared (MWIR) band and a near-infrared (NIR) band, and includes high-resolution panchromatic sensor covering a wide range of the above-described wavelength bands.

Satellite images are sometimes generated using only a single wavelength band sensor for a specific purpose, but in some cases, additional information is generated through a combination for each band. For example, RGB visible color information can be obtained by fusing all of the red, green, and blue wavelength sensor images.

Conventionally, when developing the electro-optical camera mounted on the satellite payload, wavelength bands suitable for the purpose or mission of the satellite are selected in advance, and a plurality of image sensors capable of capturing the selected wavelength bands are mounted inside the camera. This not only increases the size and weight of the camera and the cost and time required for production but also increases the difficulty in production for assembly.

In addition, immediately after a satellite is launched, there is a sufficient possibility that an image sensor of a specific band fails during mission performance or that a specific pattern of noise that is difficult to remove through post-processing occurs due to the aging of the satellite. However, there is no measure to solve this problem.

RELATED ART DOCUMENT

Patent Document

Korean Patent No. 10-2160682 (Registration Date 2020, Sep. 22.)

SUMMARY

An embodiment of the present invention provides a multi-band image generation system and method using a deep-learning network that can flexibly cope with image generation-related problems that occur when performing missions in outer space by deep learning-based image fusion using image data obtained from image sensors of different bands.

In one general aspect, a system for generating a multi-band image using a deep-learning network may include: a data input unit 100 configured to receive image data for each band from multi-band image sensors; and a model processing unit 200 configured to analyze data transmitted from the data input unit 100 by using a stored deep learning-based image generation model and receive image data of the desired band, in which the data input unit 100 may receive image data of at least one band selected from a red light (R) band, a green light (G) band, a blue light (B) band, a mid-infrared (MWIR) band, and a near-infrared (NIR) band and image data of a panchromatic band.

The data input unit 100 may generate input data by dividing input image data for each band into image patches having a predetermined size, and overlapping band image data in units of each divided image patch.

The model processing unit 200 may include: a training data generation unit 210 configured to receive all the image data for each band from the multi-band image sensors in advance and generate the received image data as training data for generating a deep learning-based image generation model; a learning processing unit 220 configured to perform learning processing of the training data generated by the training data generation unit 210 using a stored deep learning-based image generation network in advance to generate the deep learning-based image generation model according to a learning result, and the deep learning-based image generation model finally trained by the learning processing unit 220 may be stored.

The training data generation unit 210 may further include a first preprocessing unit 211 configured to receive all the image data for each band from the multi-band image sensors and match the image data for each band based on a set central point.

The training data generation unit 210 may further include a second preprocessing unit 212 configured to divide the image data for each band matched by the first preprocessing unit 211 into image patches of a predetermined size, and group the image data for each band using a sequence number assigned to each divided image patch and generate the grouped image data as the training data.

The learning processing unit 220 may perform the learning processing of the learning data generated by the second preprocessing unit 212 using the stored deep learning-based image generation network to generate the deep learning-based image generation model, and use at least one training data group applied to generate the deep learning-based image generation model to update a weight set in the deep learning-based image generation model.

The learning processing unit 220 may set any one selected from the remaining data excluding the image data of the panchromatic band as correct answer data in the image data for each band included in the training data group, input the remaining data excluding the set correct answer data to the generated deep learning-based image generation model, receive the generated image data of the band corresponding to the correct answer data to calculate a loss between the generated image data and the correct answer data, and use the calculated loss to update the weight set in the deep learning-based image generation model, and repeatedly performs the learning processing.

In another general aspect, a method of generating a multi-band image using a deep-learning network in which each step is performed by a computer-implemented system for generating a multi-band image using a deep-learning network includes: a data input step (S100) of receiving, by a data input unit, image data for each band from multi-band image sensors; an input data generation step (S200) of dividing, by the data input unit, the image data for each band input by the data input step (S100) into image patches having a predetermined size, and overlapping the image data for each band in units of each divided image patch as input data and generating the image data as input data; and an image generation step (S300) of applying, by a model processing unit, the input data generated by the input data generation step (S200) to the stored deep learning-based image generation model to receive image data of a desired band, in which, in the data input step (S100), image data of at least one band selected from a red light (R) band, a green light (G) band, a blue light (B) band, a mid-infrared (MWIR) band, and a near-infrared (NIR) band and image data of a panchromatic band are received.

The method may further include: a data collection step (S400) of receiving, by a model processing unit, all the image data for each band from multi-band image sensors in advance; a data preprocessing step (S500) of matching, by the model processing unit, all the image data for each band by the data collection step (S400) in advance based on one central point; a training data generation step (S600) of dividing, by a model processing unit, the image data matched by the data preprocessing step (S500) divided into image patches having a predetermined size in advance, and grouping the image data for each band using a sequence number assigned to each divided image patch and generate training data; and a model generation step (S700) of using, by the model processing unit, the pre-stored deep learning-based image generation network to perform learning processing on the training data generated by the training data generation step (S600) to generate and store a deep learning-based image model.

The method may further include: after performing the model generation step (S700), a first feedback step (S800) of using, by the model processing unit, any one training data group generated by the training data generating step (S600) in advance to set any one selected from the remaining data excluding the image data of the panchromatic band as correct answer data in the included image data for each band, and inputting the remaining data excluding the set correct answer data to the deep learning-based image model generated by the model generation step (S700); and a second feedback step (S900) of receiving, by the model processing unit, an analysis result by the first feedback step (S800) and sets the received analysis result as the generated image data, calculates a loss between the generated image data and the correct answer data, and uses the calculated loss to update a weight set in the deep learning-based image generation model, in which the first feedback step (S800) and the second feedback step (S900) are repeatedly performed using the loss calculated by the second feedback step (S900).

---

[Detailed Description of Main Elements]

100: Data input unit
200: Model preprocessing unit
210: Training data generation unit
211: First preprocessing unit
212: Second preprocessing unit
220: Learning processing unit

---

DETAILED DESCRIPTION OF EMBODIMENTS

Hereinafter, a multi-band image generation system and method using a deep-learning network of the present invention will be described in detail with reference to the accompanying drawings. The drawings to be provided below are provided by way of example so that the spirit of the present invention can be sufficiently transferred to those skilled in the art. Therefore, the present invention is not limited to the drawings to be provided below but may be implemented in other forms. In addition, reference numerals denote elements throughout the specification.

Technical terms and scientific terms used in the present specification have the general meaning understood by those skilled in the art to which the present invention pertains unless otherwise defined, and a description for the known function and configuration unnecessarily obscure the gist of the present invention will be omitted in the following description and the accompanying drawings.

In addition, a system means a set of components including devices, mechanisms, means, and the like, systematized in order to perform required functions and regularly interact with one another.

A multi-band image generation system and method using a deep-learning network according to an embodiment of the present invention may generate an image of a specific band based on image data obtained from a panchromatic sensor using a deep-learning network, thereby reducing the number of multi-band image sensors used.

Accordingly, it is possible to improve the manufacturing cost, period, and efficiency.

Of course, the image of the desired band can be continuously provided during mission performance without the influence of various external conditions, so safety/reliability can also be increased.

Here, for a smooth description, the multi-band image generation system and method using a deep-learning network according to the embodiment of the present invention will be described later based on a multi-band image sensor mounted on a satellite. However, it is clearly stated that this is only an embodiment of the present invention and is not limited to the multi-band image sensor mounted on a satellite.

As illustrated in FIG. 1, a PAN sensor, which is a panchromatic band sensor, generates an image by responding to the light of broadband including R, G, B, and NIR bands. Accordingly, according to a system for generating a multi-band image using a deep-learning network according to an embodiment of the present invention, it is preferable to perform learning processing to find a relationship between the image data of the panchromatic band using image data of a panchromatic band obtained through the PAN sensor and images for each multi-band and to generate an image of a specific wavelength band based on the relationship.

In particular, since the relationships between each multi-band image are not a simple linear relationship, the system for generating a multi-band image using a deep-learning network according to the embodiment of the present invention may generate an appropriate training data set for performing the learning processing in the deep-learning network and more accurately generate an image of a desired specific band using a deep-learning model generated based on the training data set in order to more accurately explore the relationship between multi-band images in a non-linear section.

Figure 2:
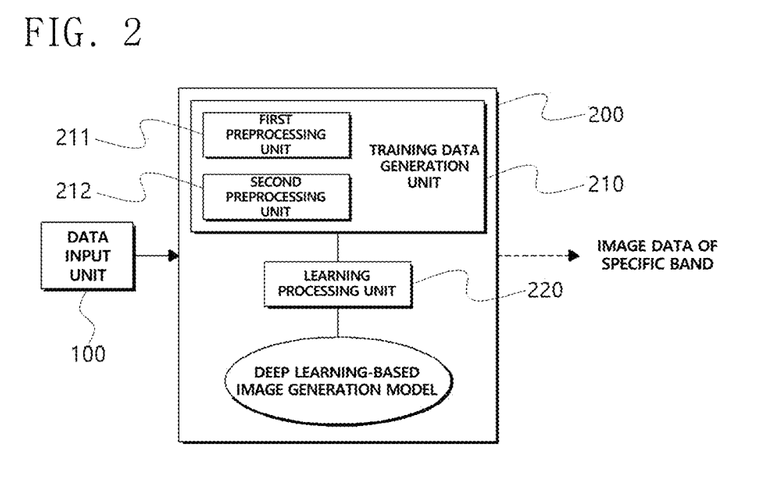
FIG. 2 is an exemplary configuration diagram illustrating a system for generating a multi-band image using a deep-learning network according to an embodiment of the present invention.

FIG. 2 is an exemplary configuration diagram illustrating a system for generating a multi-band image using a deep-learning network according to an embodiment of the present invention. Referring to FIG. 2, the system for generating a multi-band image using a deep-learning network according to the embodiment of the present invention will be described in detail.

As illustrated in FIG. 2, the system for generating a multi-band image using a deep-learning network according to the embodiment of the present invention is preferably configured to include a data input unit 100 and a model processing unit 200. In addition, it is preferable that each of the components is individually or integrally included in at least one or more arithmetic processing means including a computer to perform an operation.

Prior to describing each configuration in detail, a satellite (optical satellite) is equipped with an image sensor that may sufficiently acquire all desired bands, and when none of the mounted image sensors fails and image data for each band is transmitted under an ideal situation where there is no specific pattern of noise, it is natural that an analysis result of input data through the model processing unit 200 is output very close to correct answer data. In this case, the analysis result through the model processing unit 200 may also be utilized for verification of the transmitted image data.

However, in the system for generating a multi-band image using a deep-learning network according to the embodiment of the present invention, image data of a specific band that is a part of the image data for each band input through the data input unit 100 is damaged/damaged due to noise, or when the image data of the specific band is not input due to a failure of the image sensor itself, it is preferable to derive the image data of the specific band based on the analysis result through the model processing unit 200.

To this end, it is preferable that the data input unit 100 receives image data for each band from multi-band image sensors included in an electro-optical camera mounted on a satellite (optical optic). The image data for each band input to the data input unit 100 may be image data transmitted to a ground station while the satellite is performing a mission.

In this case, it is preferable that the image data for each band essentially includes image data of a panchromatic band, and it is preferable that image data of at least one selected from a red light (R) band, a green light (G) band, a blue light (B) band, a mid-infrared (MWIR) band, and a near-infrared (NIR) band is input together with the image data of the panchromatic band. Of course, it is most preferable to input image data of as many bands as possible.

In addition, in the case of an input actual satellite image, since a resolution is very large, there is a problem in that it is difficult to use the actual satellite image as input data of the deep learning-based image generation model of the model processing unit 200 as it is.

In order to solve this problem, it is preferable that the data input unit 100 divides images for each band into patches having a predetermined size (for example, 128*128 for setting having a predetermined size), and generates input data grouped by overlapping image data for each band in units of each divided image patch.

For example, when the data input unit 100 receives image data of panchromatic band, red light band image data, green light band image data, and near-infrared band image data as image data for each band, it is preferable that the data input unit 100 divides the images for each band into patches of a predetermined size (128*128*1) and overlaps the image data for each band in units of each divided image patch to generate grouped input data (128*128*4).

It is preferable that the model processing unit 200 analyzes input data transmitted from the data input unit 100 using a pre-stored deep learning-based image generation model, and generates image data of a desired specific band as output data.

Describing the above-described example, the input data grouped by the deep learning-based image generation model is applied, and thus, output data having a size of 128*128*1 is generated. In this case, the generated output data is most preferably image data of a blue light band which is a band that is not transmitted to the data input unit 100.

As described above, it is preferable that the model processing unit 200 generates an appropriate training data set for learning processing in a deep-learning network in order to more accurately explore the relationship between non-linear multi-band image data, and generates and stores the deep learning-based image generation model.

To this end, as illustrated in FIG. 2, the model processing unit 200 is preferably configured to include a training data generation unit 210 and a learning processing unit 220.

It is preferable that the training data generation unit 210 receives all band-specific image data from all multi-band image sensors included in the electro-optical camera mounted on the optical satellite. In this case, it is preferable that the image data input to the training data generation unit 210 is input after the optical satellite checks the normal operation of all image sensors on the ground before performing the mission.

It is preferable that the training data generation unit 210 generates training data for generating a deep learning-based image generation model using all image data for each band. That is, as illustrated in FIG. 2, it is preferable that the training data generation unit 210 generates a training data set for deep-learning network learning through the first preprocessing unit 211 and the second preprocessing unit 212.

It is preferable that the first preprocessing unit 211 uses all the image data (image data of a panchromatic band, image data of a red light band, image data of a green light band, image data of a blue light band, and image data of a near-infrared band) for each band to match the image data for each band based on one central point.

In detail, since the image sensors that obtain and transmit image data for each band are physically separated, no matter how the optical satellite captures an image of any one point, there should be a difference in gaze between the image data for each band. When training data is generated as it is in a state where such a difference (error) in gaze exists, there are problems in that the unique relational expression that exists between the image data for each band may not be applied as it is through the deep-learning network, and the distortion of information is inevitable.

In order to solve this problem, it is preferable that the first preprocessing unit 211 uses an overlap and registration module to match all the image data for each band to one point (one central point) based on feature points of the image data for each band or based on a hardware difference value of each image sensor input in advance.

It is preferable that the second preprocessing unit 212 divides the image data for each band matched by the first preprocessing unit 211 into an image patch having a predetermined size (as an example of a set of a predetermined size, 128*128), and groups the image data for each band using a sequence number assigned to each divided image patch and generates the grouped image data as the training data (training data set).

By the above-described operation of the learning processing unit 220, it is possible to search for the non-linear relationship between the image data of the panchromatic band and the image data of each multi-band by performing the repetitive learning operation using the deep-learning network, and as a result, when data from which image data of a specific band is excluded is input while including the image data of the panchromatic band as the deep learning-based image generation model that is finally trained, the excluded data is output as a result through the nonlinear relationship analysis between each multi-band.

Figure 3:
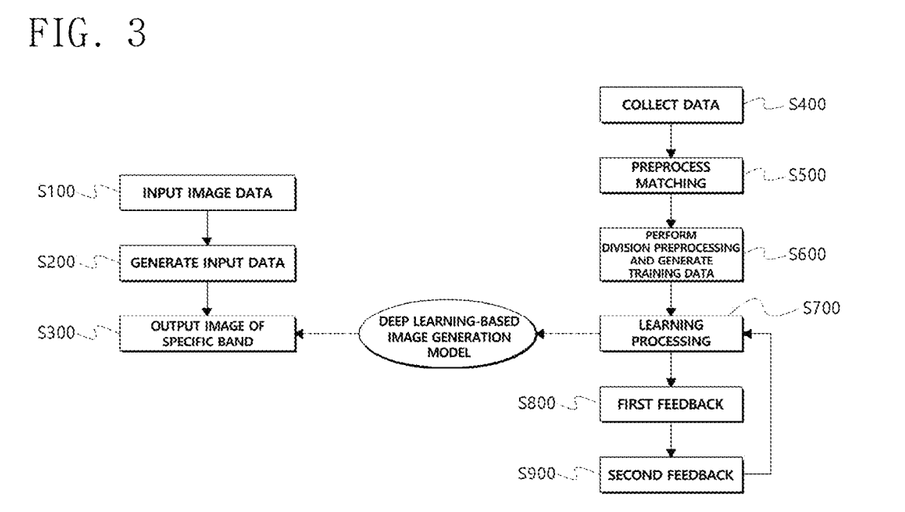
FIG. 3 is an exemplary configuration diagram illustrating a method of generating a multi-band image using a deep-learning network according to an embodiment of the present invention.

FIG. 3 is an exemplary configuration diagram illustrating a method of generating a multi-band image using a deep-learning network according to an embodiment of the present invention. Referring to FIG. 3, a method of generating a multi-band image using a deep-learning network according to an embodiment of the present invention will be described in detail.

As illustrated in FIG. 3, the method of generating a multi-band image using a deep-learning network according to the embodiment of the present invention preferably includes a data input step (S100), an input data generation step (S200), and an image generation step (S300). In addition, each step is performed by a computer-implemented system for generating a multi-band image using a deep-learning network.

Describing each step in more detail, in the data input step (S100), the data input unit 100 receives image data for each band from multi-band image sensors included in an electro-optical camera mounted on a satellite (optical satellite). The image data for each band input through the data input step (S100) may be image data transmitted to a ground station while the satellite is performing a mission.

In this case, it is preferable that the image data for each band essentially includes image data of a panchromatic band, and it is preferable that image data of at least one selected from a red light (R) band, a green light (G) band, a blue light (B) band, a mid-infrared (MWIR) band, and a near-infrared (NIR) band is input together with the image data of the panchromatic band. Of course, it is most preferable to input image data of as many bands as possible.

In the case of the input actual satellite image, since the resolution is very large, there is a problem in that it is difficult to use the actual satellite image as input data of the deep learning-based image generation model as it is.

In order to solve this problem, in the input data generation step (S200), the data input unit 100 divides images for each band into patches having a predetermined size (for example, 128*128 for setting having a predetermined size) input in the data input step (S100), and generates input data grouped by overlapping image data for each band in units of each divided image patch.

For example, when receiving image data of panchromatic band, red light band image data, green light band image data, and near-infrared band image data as image data for each band, the data input unit 100 divides the images for each band into patches of a predetermined size (128*128*1) and overlaps the image data for each band in units of each divided image patch to generate grouped input data (128*128*4).

In the image generation step (S300), the model processing unit 200 analyzes the input data generated by the input data generation step (S200) using a pre-stored deep learning-based image generation model, and generates image data of a desired specific band as output data.

Describing the above-described example, the input data grouped by the deep learning-based image generation model is applied, and thus, output data having a size of 128*128*1 is generated. In this case, the generated output data is most preferably image data of a blue light band which is a band that is not transmitted to the data input unit 100.

As described above, according to the method of generating a multi-band image using a deep-learning network according to an embodiment of the present invention, in order to more accurately explore the relationship between non-linear multi-band image data, by generating an appropriate training data set for learning processing in the deep-learning network, the deep-learning-based image generation model is generated and stored.

To this end, according to the method of generating a multi-band image using a deep-learning network, as illustrated in FIG. 3, prior to performing the image generating step (S300), the deep learning-based image generation model that has been finally trained through a data collection step (S400), a data preprocessing step (S500), a training data generation step (S600), and a model generation step (S700) is stored in advance.

In the data collection step (S400), the training data generation unit 210 receives all image data (image data of a panchromatic band, image data of a red light band, image data of a green light band, image data of a blue light band, and image data of a near-infrared band) for each band from all the multi-band image sensors included in the electro-optical camera mounted on the optical satellite. In this case, it is preferable that the input image data is input after the optical satellite checks the normal operation of all image sensors on the ground before performing the mission.

In the data preprocessing step (S500), the first preprocessing unit 211 uses all the image data for each band by the data collection step (S400) to match the image data for each band based on any one central point.

In detail, since the image sensors that obtain and transmit image data for each band are physically separated, no matter how the optical satellite captures images of any one point, there should be a difference in gaze between the image data for each band. When training data is generated as it is in a state where such a difference (error) in gaze exists, there are problems in that the unique relational expression that exists between the image data for each band may not be applied as it is through the deep-learning network, and the distortion of information is inevitable.

In order to solve this problem, in the data preprocessing step (S500), an overlap and registration module is used to match all the image data for each band to one point (one central point) based on feature points of the image data for each band or based on a hardware difference value of each image sensor input in advance.

In the training data generation step (S600), the second preprocessing unit 212 divides the image data for each band matched by the data preprocessing step (S500) into image patches having a predetermined size, and groups the image data for each band using the sequence number assigned to each divided image patch to generate the grouped image data as the training data (training data set).

In detail, in the training data generation step (S600), the overlapped-sliding and patching module is used to move the image data for each band matched to one point in the data preprocessing step (S500) while a sliding window having a predetermined size (for example, 128*128) overlaps 50%, and divide the image patch having a predetermined size according to the movement. In this case, by grouping image patches assigned the same order in an image patch stream for each band (for example, 128*128*5), a plurality of training data sets are generated.

That is, in this way, all the image data for each band obtained by capturing the exact same point (solving errors due to the difference in gaze) is divided into image patches having a predetermined size, and by grouping the image data for each band assigned the same sequence number using the assigned sequence number while dividing the image patches, a large number of training data sets are generated.

In the model generation step (S700), the learning processing unit 220 uses a pre-stored deep learning-based image generation network (as an example, there is U-net, but it is not limited thereto) to perform the learning processing of the training data generated by the training data generation step (S600) and generates the deep learning-based image generation model according to the learning result.

In this case, according to the method of generating a multi-band image using a deep-learning network according to the embodiment of the present invention, to improve the accuracy/reliability of the deep-learning-based image-generating model generated by the model generating step (S700), the weights set in the deep learning-based image generation model are updated by performing the repetitive learning processing, thereby storing the finally trained deep learning-based image generation model.

To this end, as illustrated in FIG. 3, after performing the model generation step (S700), the first feedback step (S800) and the second feedback step (S900) are repeatedly performed, and thus, in the image generation step (S300), the deep learning-based image generation model that has been finally trained is applied.

In the first feedback step (S800), the model processing unit 200 uses any one training data group generated by the training data generation step (S600), that is, at least one training data group (training data set) applied to generate the deep learning-based image generation model to set any one selected from the remaining data other than the image of the panchromatic band in the image data for each band included in the training data group as the correct answer data and applying, to the deep learning-based image generation model generated by the model generation step (S700), the remaining data other than the set correct answer data as input data.

In other words, since the image data of the panchromatic band, the image data of the red light band, the image data of the green light band, the image data of the blue light band, and the image data of the near-infrared band are composed of one training data group, among them, any one of the data other than the image data of the panchromatic band is selected and set as the correct answer data. For example, when the image data of the blue light band is set as the correct answer data, the image data of the panchromatic band, the image data of the red light band, the image data of the green light band, and the image data of the near-infrared band, which are the remaining data other than the image data of the blue light band, are applied to the deep learning-based image generation model as the input data.

In the second feedback step (S900), the model processing unit 200 receives the analysis result by the first feedback step (S800) and sets the received analysis result as the generated image data, calculates a loss between the generated image data and the correct answer data, and uses the calculated loss to update a weight set in the deep learning-based image generation model.

Specifically, when the image data of the panchromatic band, the image data of the panchromatic band, the image data of the red light band, the image data of the green light band, and the image data of the near-infrared band are applied to the deep learning-based image generation model as the input data by the first feedback step (S800), the generated image data according to the analysis result is received by the second feedback step (S900). In this case, the generated image data is preferably prediction image data of a blue light band that is data excluded from the input data.

Through this, the loss (loss) between the generated image data, which is the prediction data, and the correct answer data, which is the real data, is calculated, and the learning process is repeatedly performed while updating the weight set in the deep learning-based image generation model so that the loss is reduced.

When the finally calculated loss reaches convergence close to "0", since it means that the generated image data, which is the prediction data, is most similar to the correct answer data, which is real data, the operation is performed by applying the finally trained deep learning-based image generation model to the deep learning-based image generation model by the image generation step (S300) while performing the repetitive learning process.

According to the multi-band image generation system and method using a deep-learning network of the present invention having the above configuration, it is possible to flexibly cope with unexpected situations during mission performance by generating required image data of a specific band by fusing images with the deep-learning network, even if an image sensor of a specific band among multi-band image sensors mounted on a satellite fails or noise of a specific band is generated in the image data.

In other words, even if image sensing fails or errors such as noise occur during mission performance, it is possible to generate an image of a specific band based on image data obtained from a panchromatic sensor using a deep-learning network to reduce the number of multi-band image sensors, thereby improving the manufacturing cost, period, and efficiency.

As a result, the image of the desired band can be continuously provided during mission performance without the influence (errors) of various external conditions, so safety/reliability can also be increased.

Hereinabove, although the present invention has been described by specific matters such as detailed components, exemplary embodiments, and the accompanying drawings, they have been provided only for assisting in the entire understanding of the present invention. Therefore, the present invention is not limited to exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

What is claimed is:

1. A system for generating a multi-band image using a deep-learning network, the system comprising:
    a data input unit configured to receive image data for each band from multi-band image sensors;
    a training data generation unit configured to receive the image data for each band and to generate training data based on the image data;
    a learning processing unit configured to perform learning processing of the training data using a stored deep learning-based image generation network to generate a deep learning-based image generation model according to a learning result; and
    a model processing unit configured to store the deep learning-based image generation model and to analyze the image data transmitted from the data input unit using the deep learning-based image generation model and to generate image data of a desired band,
    wherein the data input unit receives image data of at least one band of a red light band, a green light band, a blue light band, a mid-infrared band, a near-infrared band, or a panchromatic band.

2. The system of claim 1, wherein the data input unit generates input data by dividing the image data for each band into image patches having a predetermined size, and overlapping band image data in units of each divided image patch.

3. The system of claim 1, wherein the training data generation unit further includes a first preprocessing unit configured to receive the image data for each band from the multi-band image sensors and to match the image data for each band based on a set central point.

4. The system of claim 3, wherein the training data generation unit further includes a second preprocessing unit configured to divide the image data for each band matched by the first preprocessing unit into image patches of a predetermined size, and group the image data for each band using a sequence number assigned to each divided image patch and generate the grouped image data as the training data.

5. The system of claim 4, wherein the learning processing unit is configured to:
    perform the learning processing of the training data generated by the second preprocessing unit using the stored deep learning-based image generation network to generate the deep learning-based image generation model, and
    use at least one training data group applied to generate the deep learning-based image generation model to update a weight set in the deep learning-based image generation model.

6. The system of claim 5, wherein the learning processing unit is configured to:
    set any one selected from the remaining data excluding the image data of the panchromatic band as correct answer data in the image data for each band included in the training data group,
    input the remaining data excluding the set correct answer data to the generated deep learning-based image generation model,
    receive the generated image data of the band corresponding to the correct answer data to calculate a loss between the generated image data and the correct answer data, and
    use the calculated loss to update the weight set in the deep learning-based image generation model,
    repeatedly perform the learning processing.

7. A method of generating a multi-band image using a deep-learning network in which each step is performed by a computer-implemented system for generating a multi-band image using a deep-learning network, the method comprising:
    a data input step of receiving, by a data input unit, image data for each band from multi-band image sensors;
    a data collection step of receiving, by a model processing unit, the image data for each band from multi-band image sensors;
    a data preprocessing step of matching, by the model processing unit, all the image data for each band by the data collection step based on one central point;
    a training data generation step of dividing, by the model processing unit, the image data matched by the data preprocessing step divided into image patches having a predetermined size in advance, and grouping the image data for each band using a sequence number assigned to each divided image patch and generate training data;
    a model generation step of using, by the model processing unit, a stored deep learning-based image generation network to perform learning processing on the training data generated by the training data generation step to generate and store the deep learning-based image generation model;
    an input data generation step of dividing, by the data input unit, the image data for each band into image patches having a predetermined size, and overlapping the image data for each band in units of each divided image patch as input data and generating the image data as input data; and
    an image generation step of applying, by the model processing unit, the input data generated by the input data generation step to the stored deep learning-based image generation model to generate image data of a desired band,
    wherein, in the data input step, image data of at least one band of a red light band, a green light band, a blue light band, a mid-infrared band, a near-infrared band, or a panchromatic band are received.

8. The method of claim 7, further comprising after performing the model generation step:
    a first feedback step of using, by the model processing unit, any one training data group generated by the training data generating step in advance to set any one selected from the remaining data excluding the image data of the panchromatic band as correct answer data in the included image data for each band, and inputting the remaining data excluding the set correct answer data to the deep learning-based image generation model generated by the model generation step;

a second feedback step of receiving, by the model processing unit, an analysis result by the first feedback step and sets the received analysis result as the generated image data, calculates a loss between the generated image data and the correct answer data, and uses the calculated loss to update a weight set in the deep learning-based image generation model; and repeatedly performing the first feedback step and the second feedback step using the loss calculated by the second feedback step.

* * * * *